United States Patent
Kobayashi et al.

(10) Patent No.: US 7,059,776 B2
(45) Date of Patent: Jun. 13, 2006

(54) SYNTHETIC RESIN RETAINER AND ANGULAR BALL BEARING

(75) Inventors: Umemitsu Kobayashi, Mie (JP); Kaoru Ueno, Mie (JP)

(73) Assignee: NTN Corporation, Osaka (JP)

( * ) Notice: Subject to any disclaimer, the term of this patent is extended or adjusted under 35 U.S.C. 154(b) by 168 days.

(21) Appl. No.: 10/822,777

(22) Filed: Apr. 13, 2004

(65) Prior Publication Data
US 2004/0234181 A1 Nov. 25, 2004

(30) Foreign Application Priority Data
Apr. 18, 2003 (JP) .............................. 2003-114521

(51) Int. Cl.
*F16C 33/38* (2006.01)
(52) U.S. Cl. ...................... 384/470; 384/528
(58) Field of Classification Search .............. 384/470, 384/523, 526–528, 533, 534
See application file for complete search history.

(56) References Cited

U.S. PATENT DOCUMENTS 4,572,678 A * 2/1986 Neder et al. ................ 384/533
4,838,712 A * 6/1989 Kubo et al. ................. 384/523
5,175,931 A * 1/1993 Ito .......................... 29/898.061
6,783,279 B1 * 8/2004 Wilm et al. ................. 384/470

FOREIGN PATENT DOCUMENTS

JP 7-4439 1/1995

* cited by examiner

*Primary Examiner*—Thomas R. Hannon
(74) *Attorney, Agent, or Firm*—Wenderoth, Lind & Ponack, L.L.P.

(57) ABSTRACT

An angular ball bearing is provided which can suppress runout of a retainer during high-speed rotation. A retainer of a synthetic resin is mounted between an outer ring and an inner ring, and balls are housed in pockets formed in the retainer. The pockets are cylindrical. Conical guide surfaces are formed on the cylindrical inner surface of each pocket at its inner-diameter end in the circumferential direction of the retainer. The radius of curvature of the conical guide surfaces at the large diameter ends thereof is greater than the radius of curvature of the cylindrical inner surfaces, thereby preventing the contact points between the balls and the conical guide surfaces from becoming markedly displaced in the diametric direction during high-speed rotation, and thus suppressing runout of the retainer.

6 Claims, 12 Drawing Sheets

SYNTHETIC RESIN RETAINER AND ANGULAR BALL BEARING

BACKGROUND OF THE INVENTION

This invention relates to a synthetic resin retainer for ball bearings suitable for high-speed rotation and an angular ball bearing.

As an angular ball bearing suitable for high-speed rotation for rotatably supporting a rotary shaft rotated at a high speed, such as a spindle of a machine tool, one described in Japan patent publication 7-4439 is known.

Figure 15:
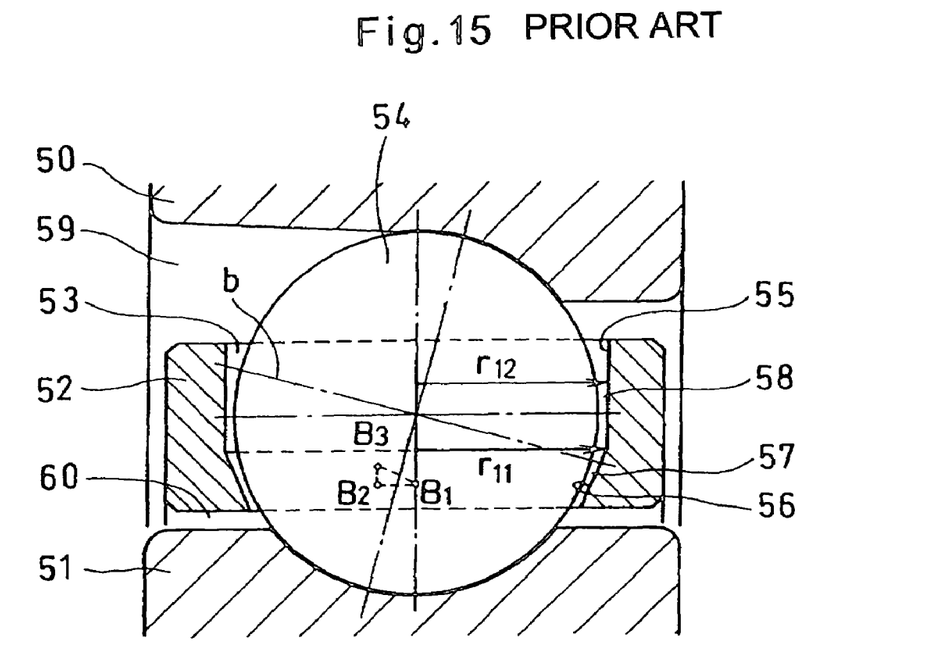
FIG. 15 is a sectional view showing a conventional angular ball bearing.

FIG. 15 shows the conventional angular ball bearing. It has a retainer 52 made of a synthetic resin and mounted between an outer ring 50 and an inner ring 51. A ball 54 is accommodated in each of a plurality of pockets 53 formed in the retainer 52 at equal circumferential intervals to support the outer ring 50 and the inner ring 51 so as to be rotatable relative to each other.

The pockets 53 formed in the retainer 52 are cylindrical and are each formed with a conical guide surface 56 at the radially inner end of the cylindrical inner surface 55 so as to be guided by the ball 54. A circumferential, axial and diametric guide clearance 57 is formed between the conical guide surface 56 and the ball 54. The guide clearance 57 is smaller than a pocket clearance 58 formed between the ball 54 and the cylindrical inner surface 55 of each pocket 53.

Here, the radius of curvature r11 of the conical guide surfaces 56 at their radially outer end is equal to the radius of curvature of the cylindrical inner surfaces 55.

In the ball bearing having such a structure, during rotation of the bearing, the balls 54 make point contact with the conical guide surfaces 56, so that a lubricant can flow around the contact points. Thus shortage of a lubricant is less likely to occur.

Further, since the retainer 52 is guided by the balls, the outer and inner peripheral surfaces of the retainer 52 rotate in a non-contact state relative to the outer ring 50 and the inner ring 51, so that no friction noise is produced.

Since the conventional angular ball bearing shown in FIG. 15 is of such a structure that the retainer 52 is supported by contact between the conical guide surfaces 56 and the balls 54, it has the following problem.

Figure 16:
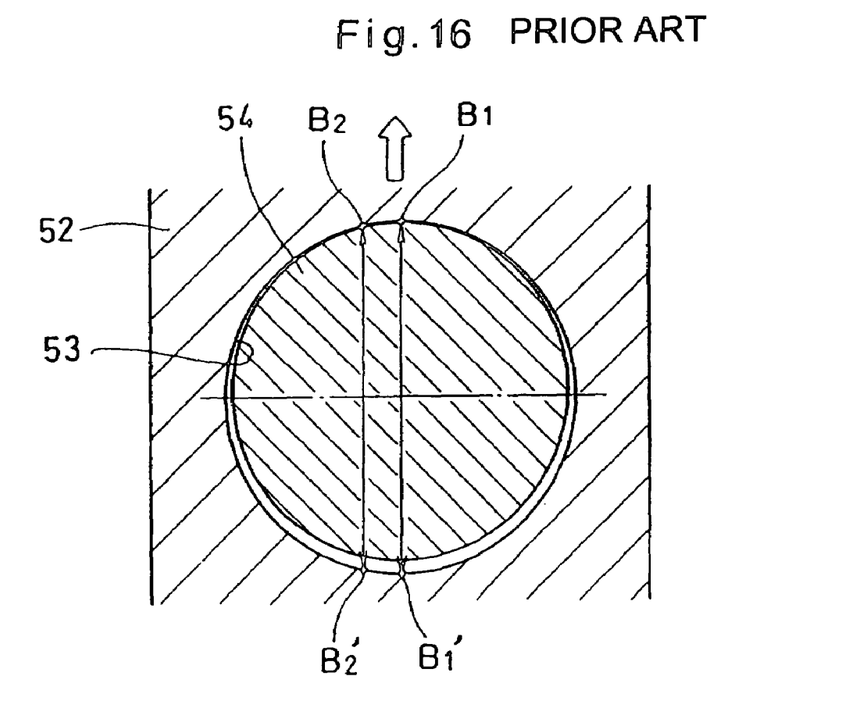
FIG. 16 is a sectional view showing how a ball and a pocket formed in the retainer contact.
Figure 17:
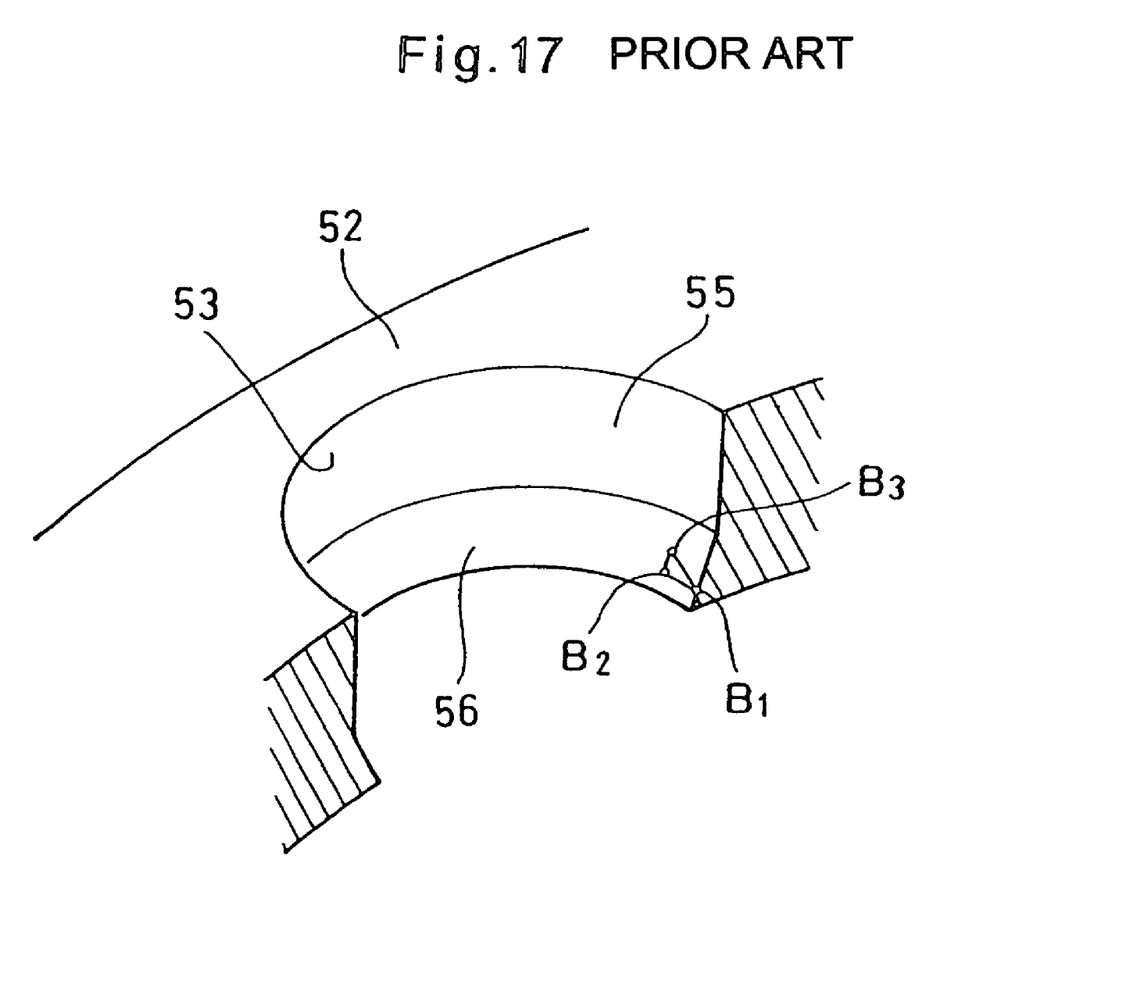
FIG. 17 is a perspective view showing a portion of a retainer.

That is, when the angular ball bearing rotates at high speed, the balls 54, which rotate about their own axes and about a common axis, contact the conical guide surfaces 56 at point B1 as shown in FIGS. 16 and 17. At this time, each ball 54 rotates about its own axis b shown in FIG. 15. Due to contact with the ball 54, the retainer 52 will axially move, so that the contact point B1 with the ball 54 tends to move toward point B2. But since the distance between point B2 and its opposed point B2' is shorter than the distance between point B1 and its opposed point B1, the contact point also moves toward the large diameter end of the conical guide surface 56 while moving axially of the retainer 52, and thus moves to the point B3.

Thus, while the angular ball bearing is rotating at high speed, the contact points between the balls 52 and the conical guide surfaces 56 move from point B1 to point B3, so that diametric thrust force is induced in the retainer 52, causing runout of the retainer 52.

Such runout of the retainer 52 is remarkable if used in a vertical position in which the central axis of the angular ball bearing is vertical.

Further, in the conventional angular ball bearing, since a radially outer lubricant filling space 59 formed between the outer ring 50 and the retainer 52 and a radially inner lubricant filling space 60 formed between the retainer 52 and the inner ring 51 communicate with each other through the small pocket clearances 58 and the guide clearances 57, fluidity of the lubricant is so bad that heat tends to build up due to stirring of the lubricant.

Further, since the contact between the balls 54 and the conical guide surfaces 56 is contact between curved surfaces of the balls 54 and the conical guide surfaces 56 having little difference in the radius of curvature, shearing force when lubricant is sheared due to contact with the balls 54 which are rotating about their own axes is large, so that the bearing torque is large.

An object of this invention is to provide a synthetic resin retainer and an angular ball bearing which are less likely to run out during high-speed rotation, can reduce the bearing torque, and are suitable for high-speed rotation.

SUMMARY OF THE INVENTION

According to this invention, there is provided a synthetic resin retainer comprising an annular member made of a synthetic resin and formed with a plurality of pockets to receive balls, the pockets being cylindrical, wherein a pair of conical guide surfaces to be guided by the balls are formed on the cylindrical inner surface of the each pocket at an inner-diameter end thereof so as to oppose each other in the circumferential direction of the retainer, and wherein the radius of curvature of the each conical guide surface at a large-diameter end thereof is larger than the radius of curvature of the cylindrical inner surface of each pocket.

As described above, since the radius of curvature of the conical guide surfaces formed on the retainer at their large-diameter ends is greater than the radius of curvature of the cylindrical inner surfaces of the cylindrical pockets, it is possible to reduce diametric displacement when the contact points between the balls and the conical guide surfaces displace in the axial and diametric directions of the retainer on the conical guide surfaces. Thus, the diametric thrust force of the retainer is lightened, thus making it possible to suppress runout of the retainer.

Since the difference in radius of curvature between the balls and the conical guide surfaces is large compared to the conventional arrangement, the shearing force when the lubricant is sheared due to contact with the balls, which are rotating about their axes, decreases. Thus it is possible to reduce the bearing torque.

In the retainer according to this invention, in the cylindrical inner surface of each pocket, diametric grooves are formed so as to divide the cylindrical inner surface into four parts comprising a pair of arcuate inner surfaces opposing each other in the circumferential direction of the retainer, and a pair of arcuate inner surfaces opposing each other in the axial direction of the retainer, the outer diameter side and inner diameter side of the retainer communicate with each other through four diametric grooves. Thus it is possible to increase fluidity of the lubricant between the outer diameter side and inner diameter side of the retainer, so that it is possible to suppress heat buildup due to stirring of the lubricant.

According to a second aspect of the invention, there is provided a synthetic resin retainer comprising an annular member made of a synthetic resin and formed with a plurality of pockets to receive balls, the pockets being cylindrical, wherein a pair of conical surfaces are formed on the cylindrical inner surface of each pocket at an inner-diameter end so as to oppose in the circumferential direction of the retainer, wherein a lubricant retaining surface is integrally formed from the inner-diameter end of each conical surface inwardly of the pocket, and wherein a linear ball guide edge to be guided by a ball is formed inside each lubricant supporting surface so as to be parallel to the axis of the retainer.

As described above, by guiding the linear guide edges that are parallel to the axis of the retainer with the balls, even if the retainer moves in the axial direction, the contact points with the balls simply move in the axial direction of the retainer. Thus, no thrust force in the diametric direction of the retainer will be produced, so that it is possible to prevent runout of the retainer.

Since the contact between the balls and the ball guide edges is point contact, the shearing force when the lubricant is sheared at the contact points is small, so that it is possible to markedly reduce the bearing torque.

Further, since the lubricant can be retained on the lubricant supporting surfaces, stable lubricating performance can be obtained.

Further, if the retainer moves axially and the cylindrical inner surfaces of the pockets in the axial direction of the retainer contact the balls, since the contact points are positioned near axes about which the balls rotate, torque unevenness is difficult to develop.

In the synthetic resin retainer according to the second aspect of the invention, in the cylindrical inner surface of each pocket, diametric grooves are formed so as to divide said cylindrical inner surface into four parts comprising a pair of arcuate inner surfaces opposing each other in the circumferential direction of the retainer, and a pair of arcuate inner surfaces opposing each other in the axial direction of the retainer, lubricant filling the outer diameter side of the retainer and lubricant filling the inner diameter side of the retainer communicate with each other through the four diametric grooves. Thus it is possible to increase fluidity of the lubricant, and to suppress heat buildup due to stirring of the lubricant.

According to this invention, there is provided an angular ball bearing comprising a synthetic resin retainer mounted between an outer ring and an inner ring, and balls mounted in a plurality of pockets formed spaced circumferentially from each other in the retainer to support the outer ring and the inner ring so as to be rotatable relative to each other, wherein the pockets are cylindrical, wherein in the cylindrical inner surface of each pocket, diametric grooves are formed so as to divide the cylindrical inner surface into four parts comprising a pair of arcuate inner surfaces opposing each other in the circumferential direction of the retainer, and a pair of arcuate inner surfaces opposing each other in the axial direction of the retainer, wherein a pair of conical guide surfaces to be guided by the balls are formed on the cylindrical inner surface of the each pocket at an inner-diameter end thereof so as to oppose each other in the circumferential direction of the retainer, and wherein the radius of curvature of each conical guide surface at a large-diameter end thereof is larger than the radius of curvature of the cylindrical inner surface of each pocket.

According to this invention, there is provided another angular ball bearing comprising a synthetic resin retainer mounted between an outer ring and an inner ring, and balls mounted in a plurality of pockets formed spaced circumferentially from each other in the retainer for supporting the outer ring and the inner ring so as to be rotatable relative to each other, wherein the pockets are cylindrical, wherein in the cylindrical inner surface of each pocket, diametric grooves are formed so as to divide the cylindrical inner surface into four parts comprising a pair of arcuate inner surfaces opposing each other in the circumferential direction of the retainer, and a pair of arcuate inner surfaces opposing each other in the axial direction of the retainer, wherein a pair of conical surfaces are formed on the cylindrical inner surface of each pocket at an inner-diameter end so as to oppose in the circumferential direction of the retainer, wherein a lubricant retaining surface is integrally formed from the inner-diameter end of each conical surface inwardly of the pocket, and wherein a linear ball guide edge to be guided by a ball is formed inside each lubricant supporting surface so as to be parallel to the axis of the retainer.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

The embodiments of this invention will be described with reference to FIGS. 1–14. FIGS. 1–6 show the first embodiment of the angular ball bearing according to this invention. It comprises an outer ring 1, an inner ring 11, a retainer 21 mounted between the outer and inner rings 1 and 11, and balls 31 retained by the retainer 21.

Figure 1:
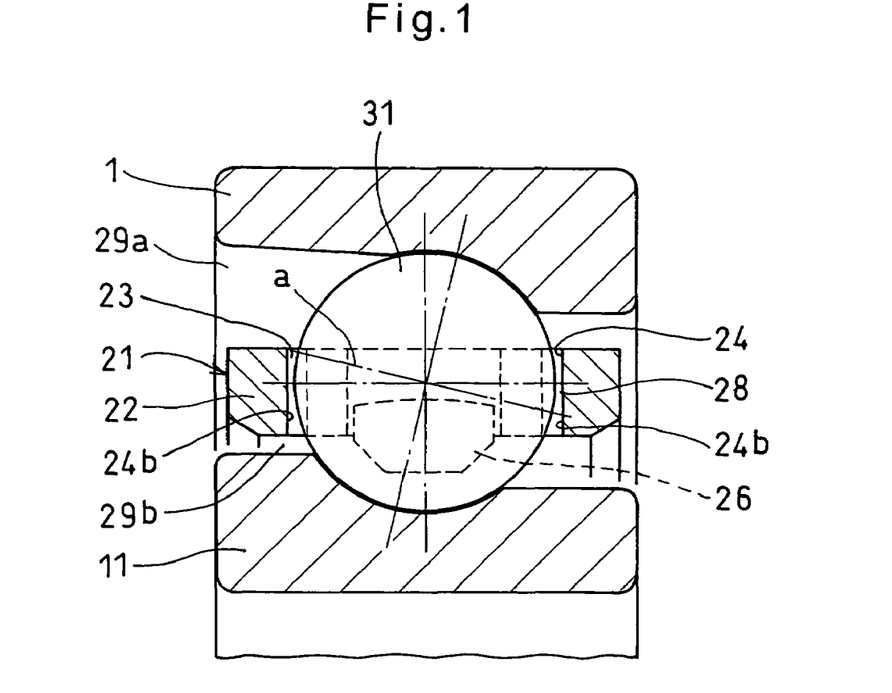
FIG. 1 is a sectional view showing a first embodiment of the angular ball bearing according to this invention.

The retainer 21 is an article molded of a synthetic resin. As the synthetic resin, polyamide (PA), polyetherether ketone (PEEK) or polyether sulfone (PES), to which is added a filler such as glass fiber or carbon fiber, may be used.

Figure 3:
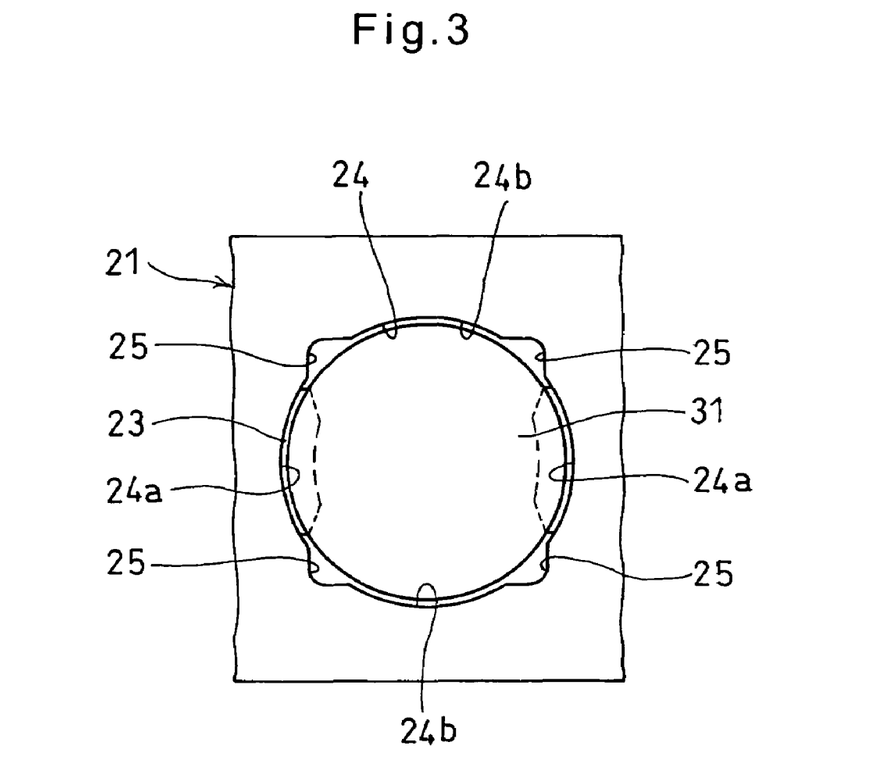
FIG. 3 is a plan view of a retainer shown in FIG. 1.

The retainer 21 comprises an annular body 22 in which a plurality of pockets 23 are formed circumferentially at equal intervals to receive the balls 31.

The pockets 23 are cylindrical, and on the cylindrical inner surface 24 of each pocket 23, four grooves 25 are formed so as to diametrically extend. The diametric grooves 25 divide the cylindrical inner surface 24 of each pocket 23 into four areas comprising a pair of circumferentially-opposed arcuate inner surfaces 24a of the retainer 21, and a pair of axially-opposed arcuate inner surfaces 24b of the retainer.

Figure 2:
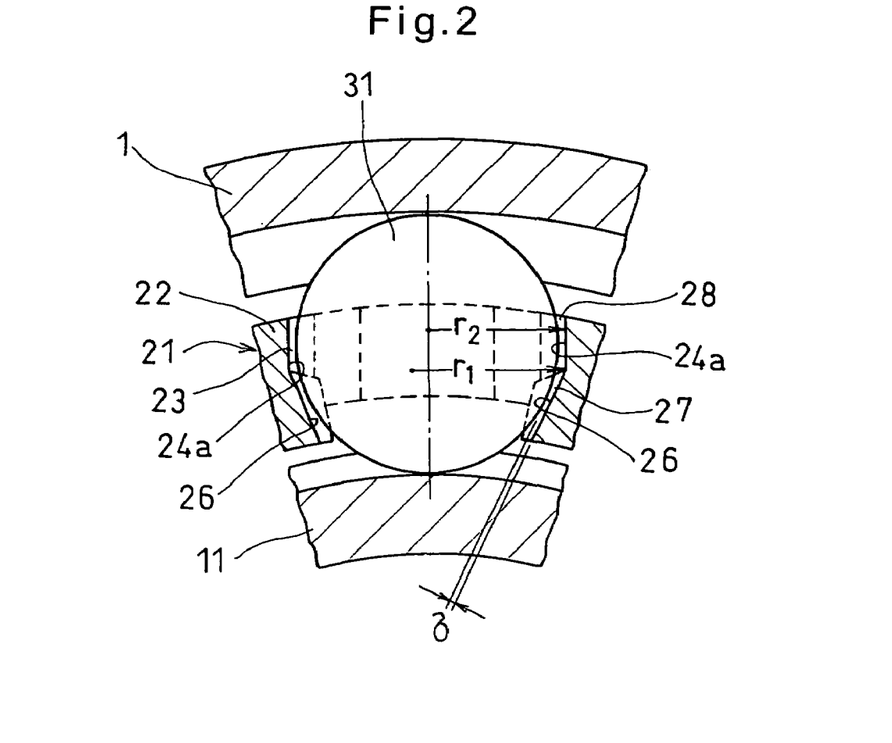
FIG. 2 is a vertical sectional side view of the same.

As shown in FIG. 2, the arcuate inner surfaces 24a, which oppose each other in the circumferential direction of the retainer, have at their radially inner ends conical guide surfaces 26 to guide the ball.

The radius of curvature r1 of each of the conical guide surfaces 26 at its large-diameter end is greater than the radius of curvature r2 of the cylindrical inner surface 24 of each pocket 23, and the size δ of guide clearances 27 formed between the conical guide surfaces 26 and the balls 31 is smaller than pocket clearances 28 formed between the cylindrical inner surfaces 24 of the pockets 23 and the balls 31.

If the radius of curvature of the conical inner surfaces 26 is too large, it will be impossible to ensure an axial width dimension required for the strength of the retainer 21. Thus, the radius of curvature r1 of the conical guide surfaces 26 is preferably about 110%–140% of the radius of curvature of the cylindrical inner surfaces 24 of the pockets 23.

Figure 7:
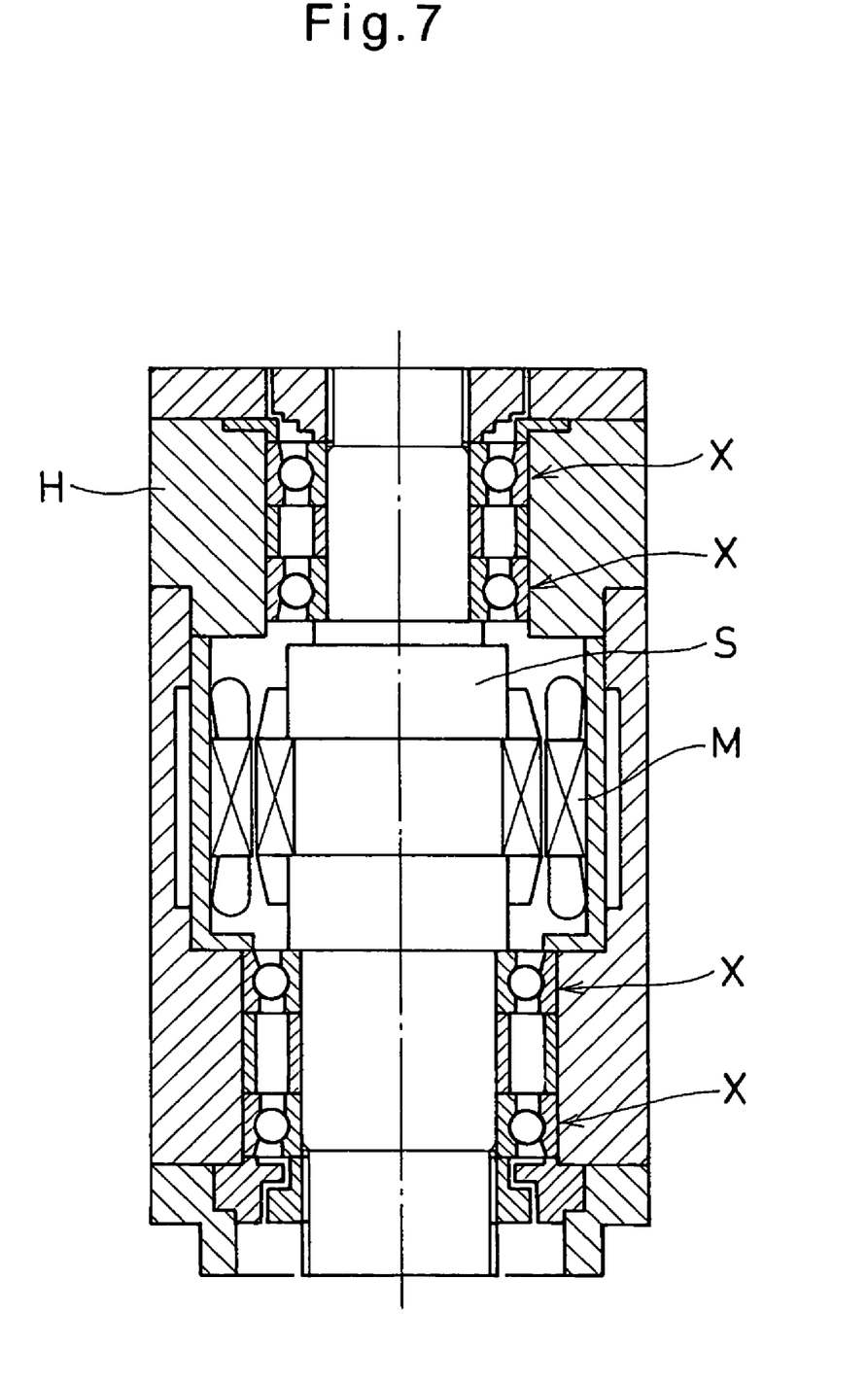
FIG. 7 is a sectional view showing how the angular ball bearing shown in FIG. 1 is used.

The angular ball bearing of the first embodiment has a structure as described above. FIG. 7 shows an example of use of this angular ball bearing. In this example, a plurality of angular ball bearings X shown in the embodiment are mounted in a housing H spaced vertically from each other so that their central axes will align. By the angular ball bearings X, a spindle S of a machine tool rotated by a motor M is rotatably supported.

In this state of use, when the spindle S rotates at high speed, the balls 31 of the angular bearings shown in FIGS. 1 and 2 rotate about their own axes and a common axis.

Figure 4:
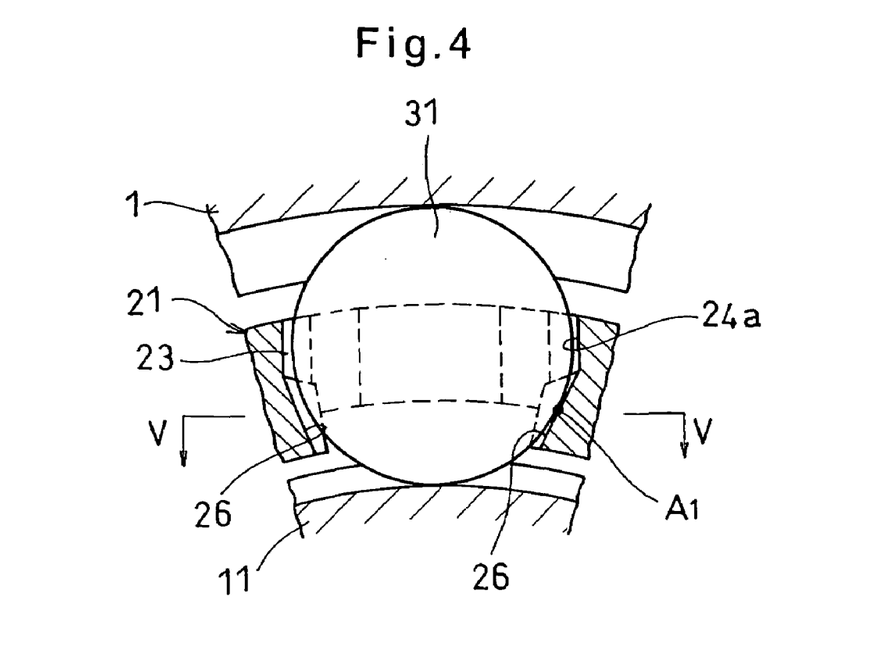
FIG. 4 is a sectional view of the angular ball bearing while it is being rotated at high speed.
Figure 5:
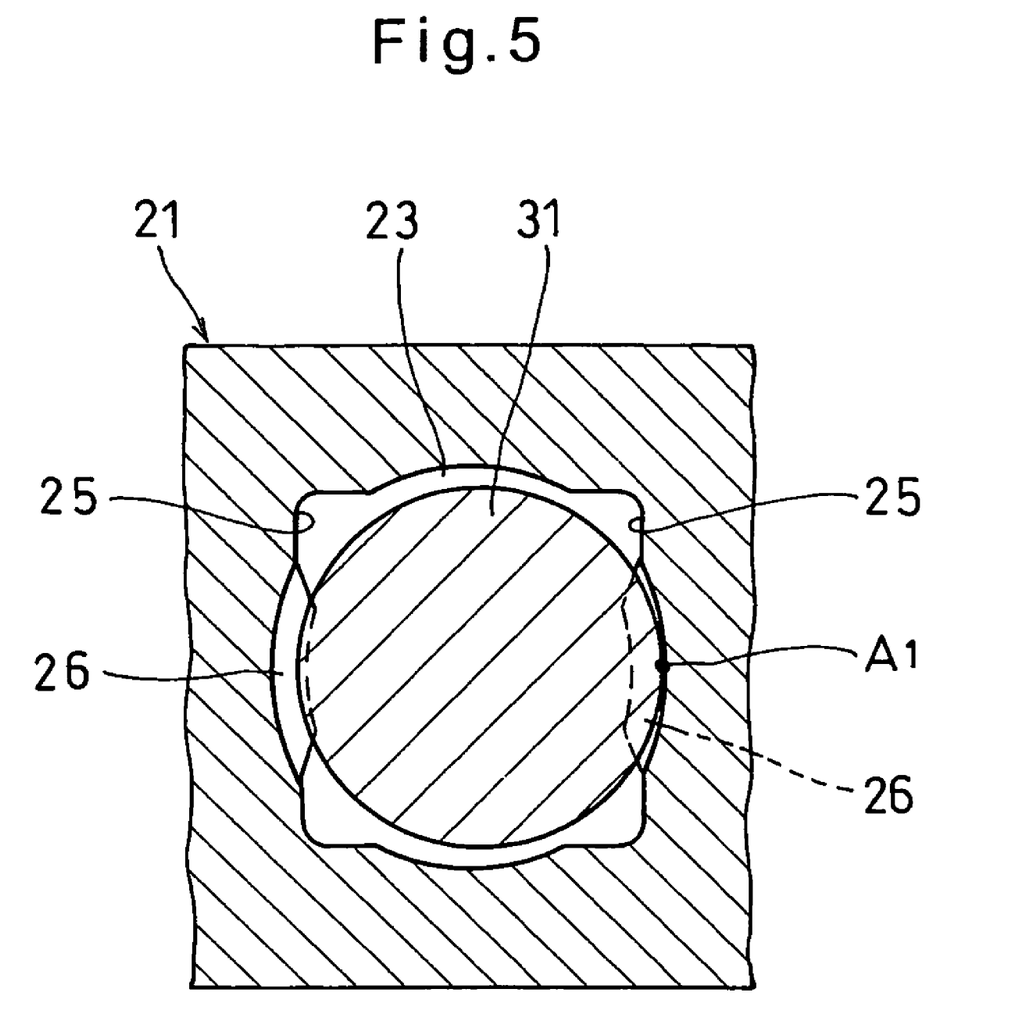
FIG. 5 is a sectional view along line V—V of FIG. 4.

At this time, since the guide clearances 27, which are formed between the balls 31 and the conical guide surfaces 26, are smaller than the pocket clearances 28, which are formed between the balls 31 and the cylindrical inner surfaces 24 of the pockets 23, the balls 31 contact the conical guide surfaces 26 as shown in FIG. 4.

Further, the balls 31 rotate about their own axes a shown in FIG. 1, and the retainer 21 moves axially due to contact with the balls 31.

Figure 6:
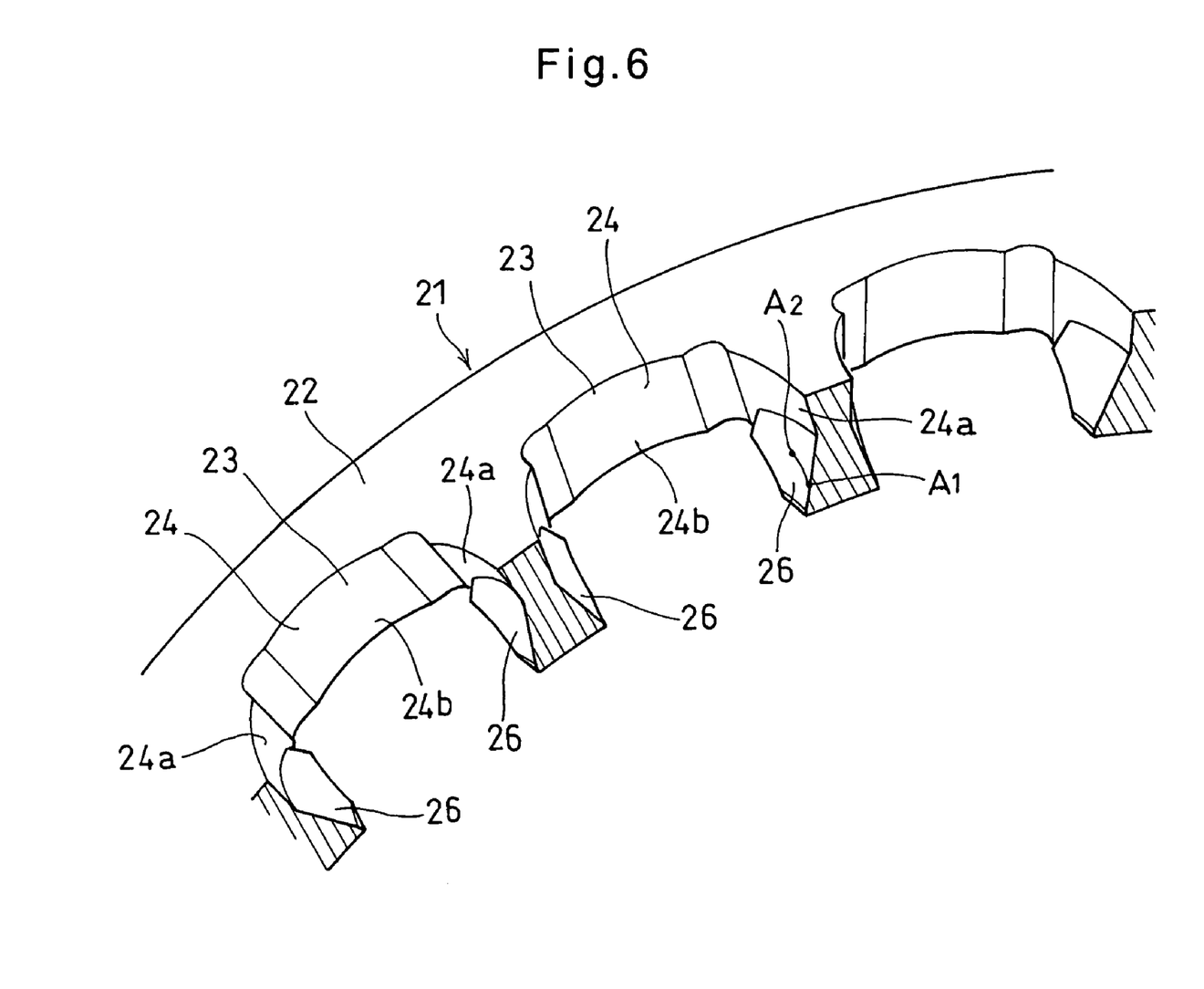
FIG. 6 is a perspective view showing a portion of the retainer.

Thus, the contact points A1 (FIG. 4) between the balls 31 and the conical guide surfaces 26 move radially outwardly while moving axially of the retainer on the conical guide surfaces 26. That is, as shown in FIG. 6, the contact points move from points A1 to points A2, so that thrust force is imposed in the diametric and axial directions on the retainer 21.

At this time, since the radius of curvature r1 of the conical guide surfaces 26 at their large-diameter ends is greater than the radius of curvature r2 of the cylindrical inner surfaces 24 of the pockets 23, diametric displacement of the retainer 21 decreases compared with the retainer in which the above radii of curvature are equal (conventional retainer shown in FIG. 15). Thus, the diametric thrust force applied to the retainer 21 decreases, so that runout of the retainer 21 is suppressed.

Further, since the radius of curvature r1 of the conical guide surfaces 26 at their large-diameter ends is greater than the radius of curvature r2 of the cylindrical inner surfaces 24 of the pockets 23, the difference in the radius of curvature between the balls 31 and the conical guide surfaces 26 further increases. This big difference in the radius of curvature decreases the shearing force when the lubricant is sheared by the rotation of the balls 31 about their own axes. Thus, it is possible to reduce the bearing torque.

Further, by providing four diametric grooves 25 in the cylindrical inner surface 24 of each pocket 23, a lubricant filling space 29a which is formed on the radially outer side of the retainer 21 and a lubricant filling space 29b which is formed on its radially inner side communicate with each other through the diametric grooves 25. This increases fluidity of lubricant such as grease between the outer-diameter side filling space 29a and inner-diameter side filling space 29b. Thus, it is possible to reduce heat buildup due to stirring of the lubricant and suppress temperature rise of the angular ball bearing.

Figure 8:
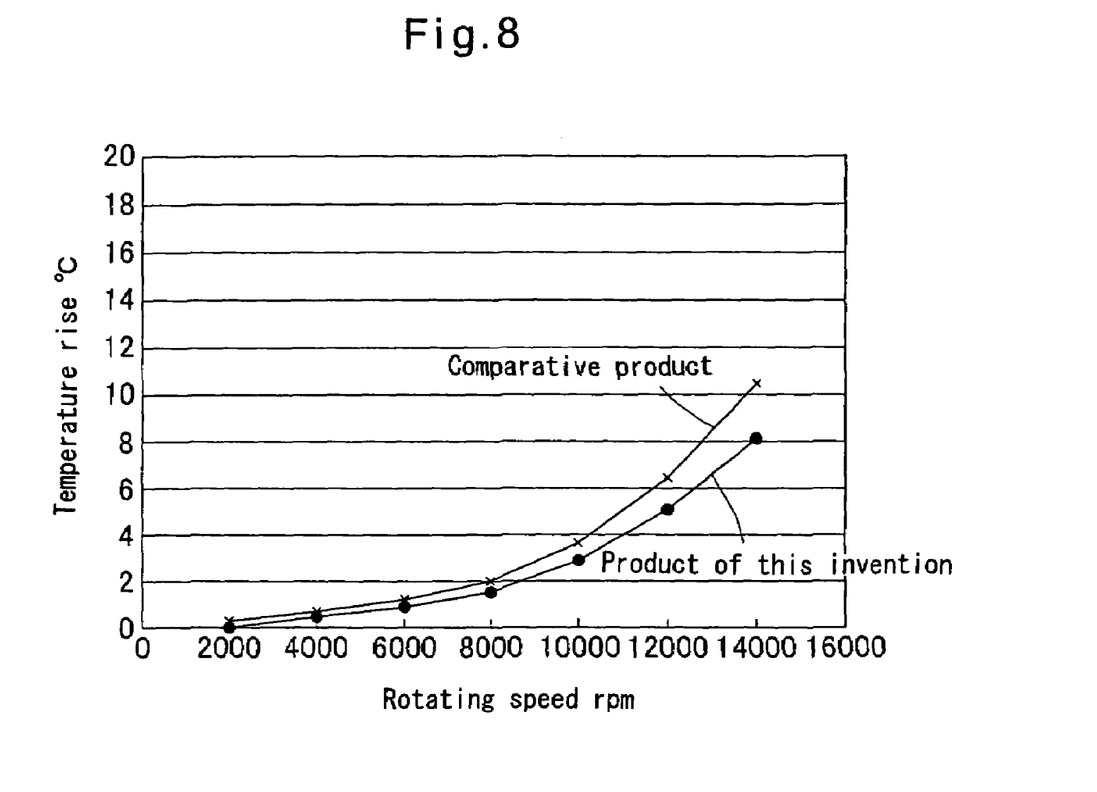
FIG. 8 is a graph showing measurement results of the outer ring temperature while the angular ball bearing is being rotated at high speed.
Figure 9:
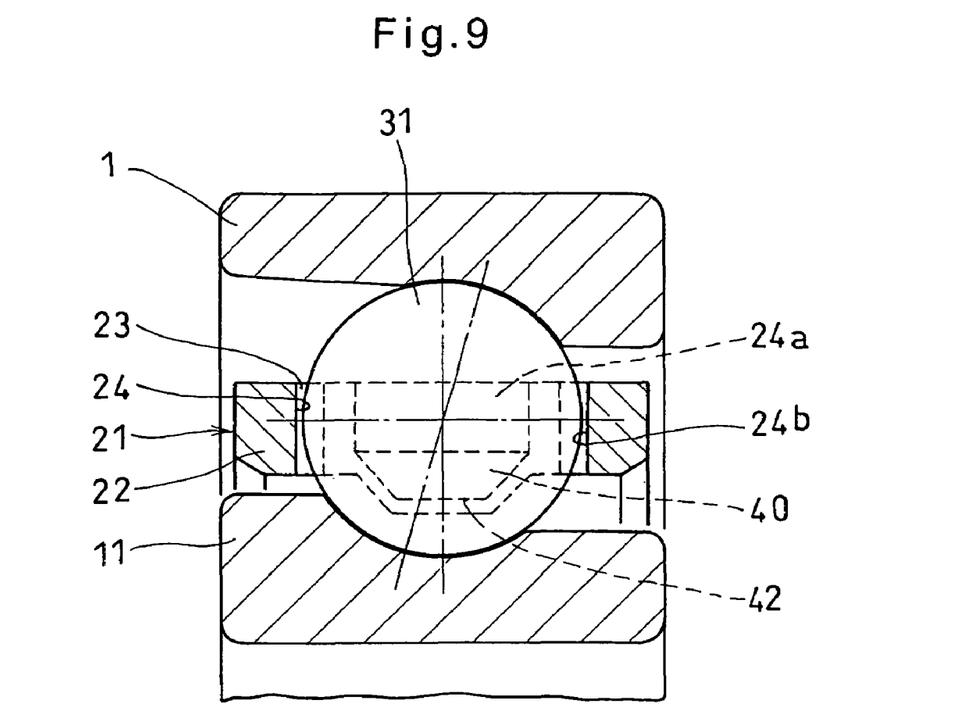
FIG. 9 is a sectional view showing a second embodiment of the angular ball bearing.
Figure 10:
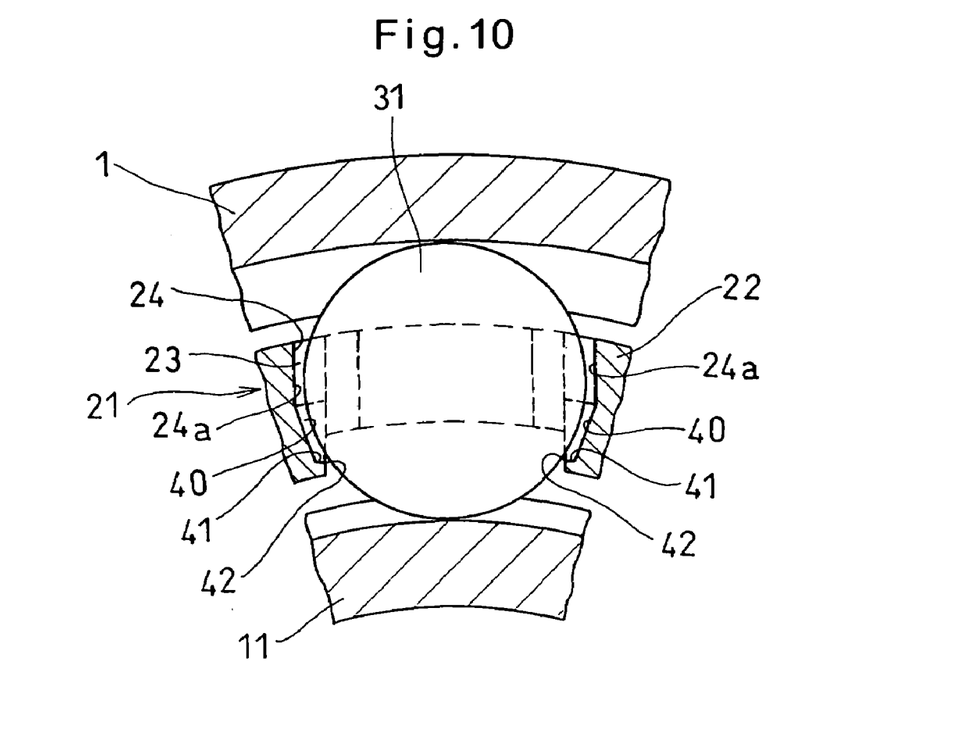
FIG. 10 is a vertical sectional view of FIG. 9.
Figure 11:
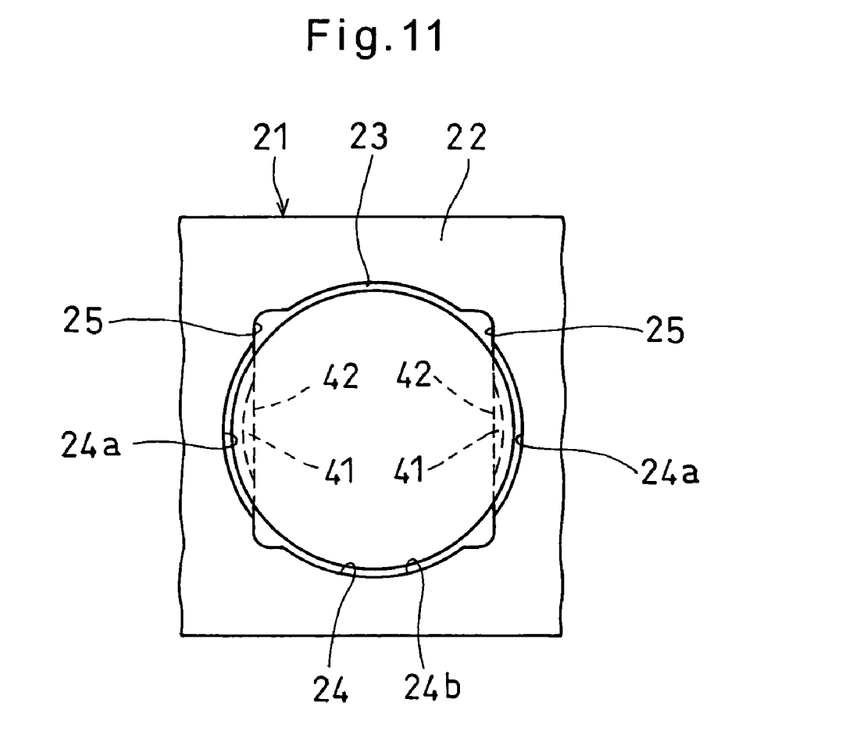
FIG. 11 is a plan view of a retainer shown in FIG. 9.

For reference, an angular ball bearing in which balls 31 and the retainer 21 as an article of the embodiment, having the below-shown dimensions, were mounted between the outer ring 1 and the inner ring 11 (article of the present invention) and lubricated with grease, and the temperature of the outer ring 1 was measured. The measurement results are shown in FIG. 8. For comparison, measurement results of the temperature of the outer ring of an angular ball bearing in which the conventional retainer 52 shown in FIG. 15 was mounted (comparative article) are shown, too.

Outer diameter D1 of the balls 31=8.7313 mm
Outer diameter D2 of the retainer 21=67.7 mm
Inner diameter D3 of the retainer 21=62 mm
Inner diameter dl of the pockets 23=9.0 mm
Radius of curvature r1 of the conical inner surfaces 26=6.5 mm
Radius of curvature r2 of the diametric grooves 25=0.8 mm The radius of the conical guide surfaces 56 in the angular ball bearing as a comparative article at the large-diameter ends was 4.5 mm, and the outer diameter and inner diameter of the retainer 52 were the same as with the retainer 21 of the article of the embodiment.

Also, in measuring the temperature, preload of 20 kgf was applied to the angular ball bearings.

As will be apparent from the measurement results, the temperature rise is suppressed in the angular ball bearing as an article embodying the present invention.

Here, if the radius of curvature r1 of the conical guide surfaces 26 at their large-diameter ends is equal to the radius of curvature r2 of the cylindrical inner surfaces 24 of the pockets 23, if uneven shrinkage occurs during molding of the retainer 21, the contact points with the balls 31 might vary in the axial direction. Such unevenness of the contact points may induce axial thrust force which can cause runout of the retainer 21.

But in the retainer 21 of the embodiment, since the radius of curvature r1 of the conical guide surfaces 26 at their large-diameter ends is greater than the radius of curvature r2 of the cylindrical inner surfaces 24 of the pockets 23, axial displacement of the contact points with the balls 31 due to uneven shrinkage during molding of the retainer 21 is suppressed, so that the central portions of the conical guide surfaces 26 with respect to the axial direction of the retainer are stably guided by contact with the balls 31. This prevents axial thrust force from being induced.

FIGS. 9–13 show the second embodiment of the angular ball bearing according to this invention. The second embodiment differs from the angular ball bearing of the first embodiment in that conical surfaces 40 are formed on a pair of circumferentially-opposed arcuate inner surfaces 24a of a cylindrical inner surface 24 of each pocket 23 at their radially inner ends, that a lubricant support surface 41 is integrally formed so as to face inwardly of each pocket 23 from the small-diameter end of each conical surface 40, and that inside the lubricant support surface 41, a linear ball guide edge 42 guided by the ball 31 parallelly to the axis of the retainer 21 is formed.

Thus, to the same portions as those in the angular ball bearing of the first embodiment, the same numerals are attached and their description is omitted.

Figure 12:
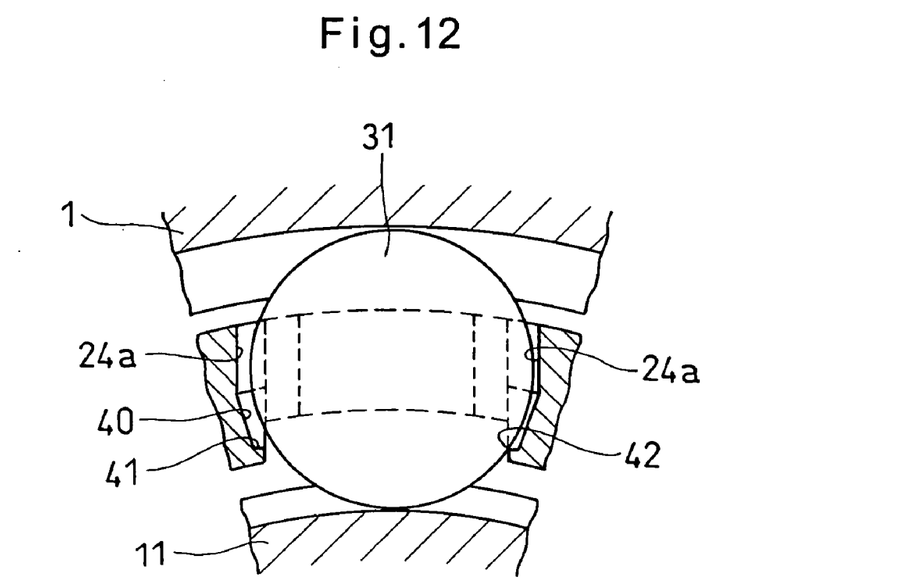
FIG. 12 is a sectional view showing the angular ball bearing which is being rotated at high speed.
Figure 13:
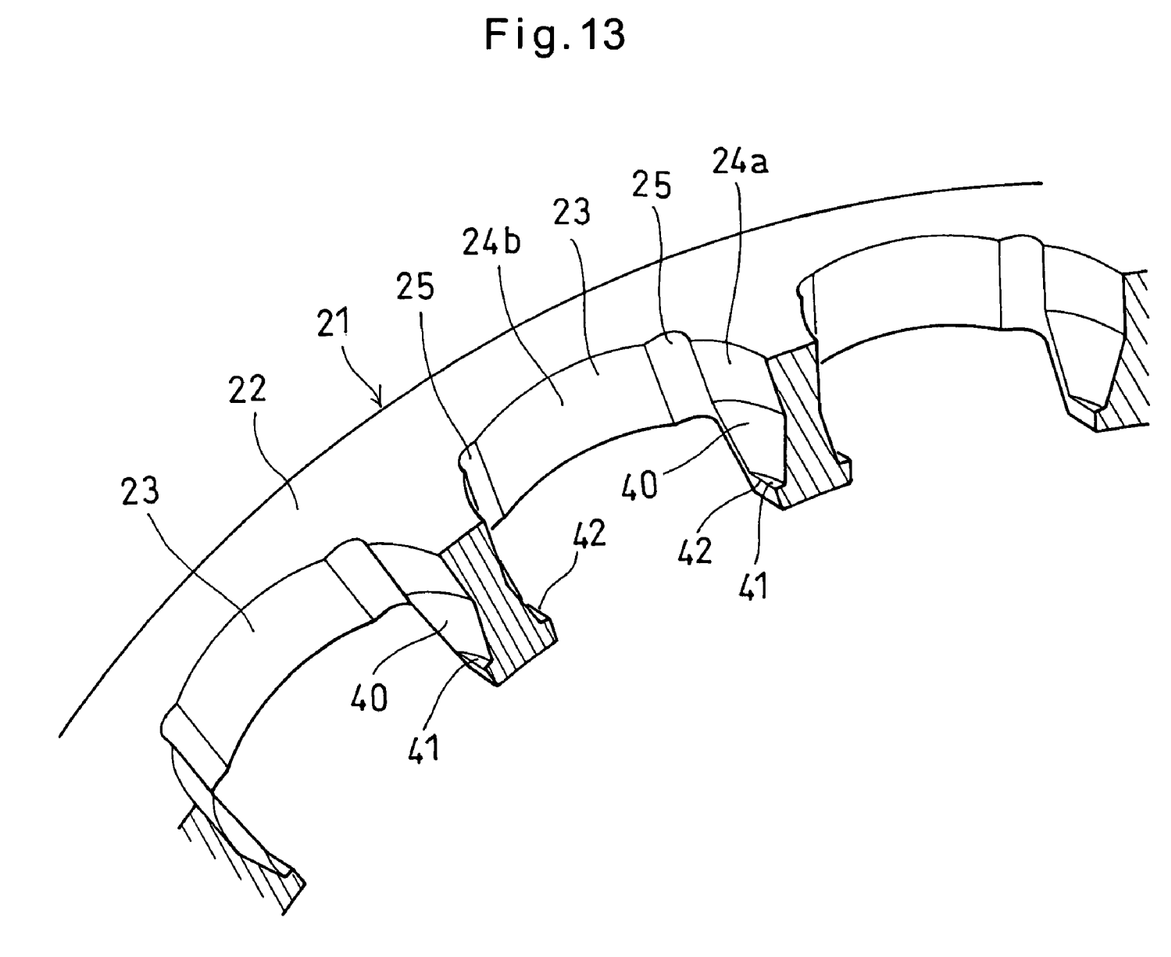
FIG. 13 is a perspective view showing a portion of the retainer.

In the angular ball bearing having such a structure, when the bearing is rotated at high speed, as shown in FIG. 12, the ball guide edges 42 contact the balls 31. Since the ball guide edges 42 are straight and parallel to the axis of the retainer 21, even if the retainer 21 moves axially, the contact points with the balls 31 simply move axially of the retainer. Thus, no diametric thrust force is produced in the retainer 21 and it is possible to prevent runout of the retainer 21. Also, since the shearing force when the lubricant is sheared by the balls 31 which rotate about their axes is small, it is possible to markedly reduce the bearing torque.

Further, since the ball guide edges 42, which contact the balls 31, are straight, accuracy required during injection molding can be easily obtained. This provides a retainer 21 that is high in accuracy.

Further, since it is possible to retain lubricant on the lubricant retaining surfaces 41, stable lubricating performance is assured.

Besides, since four diametric grooves 25 are formed in the cylindrical inner surface 24 of each pocket 23, like the angular ball bearing shown in the first embodiment, it is possible to suppress temperature rise of the bearing.

Figure 14A:
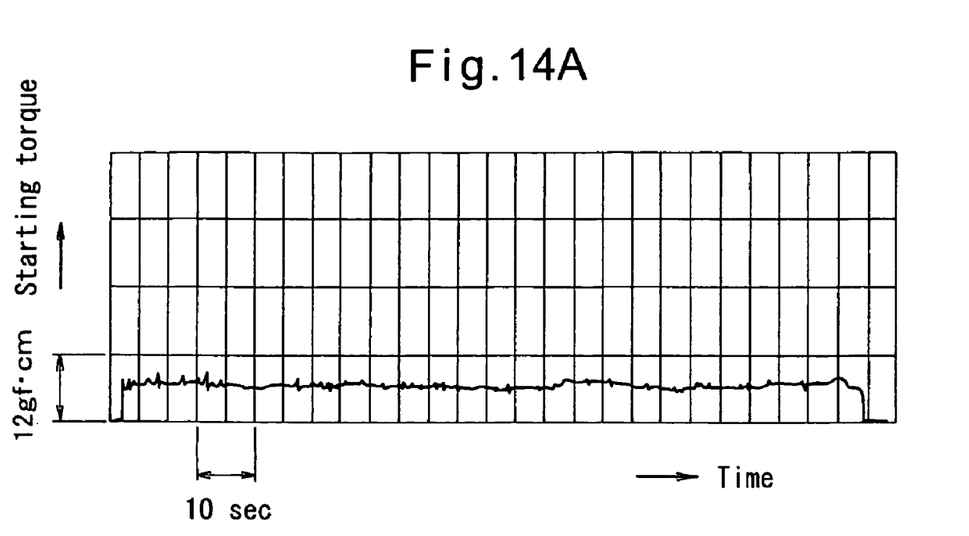
FIG. 14A is a graph showing measurement results of the starting torque of the angular ball bearing of an article of the present invention.
Figure 14B:
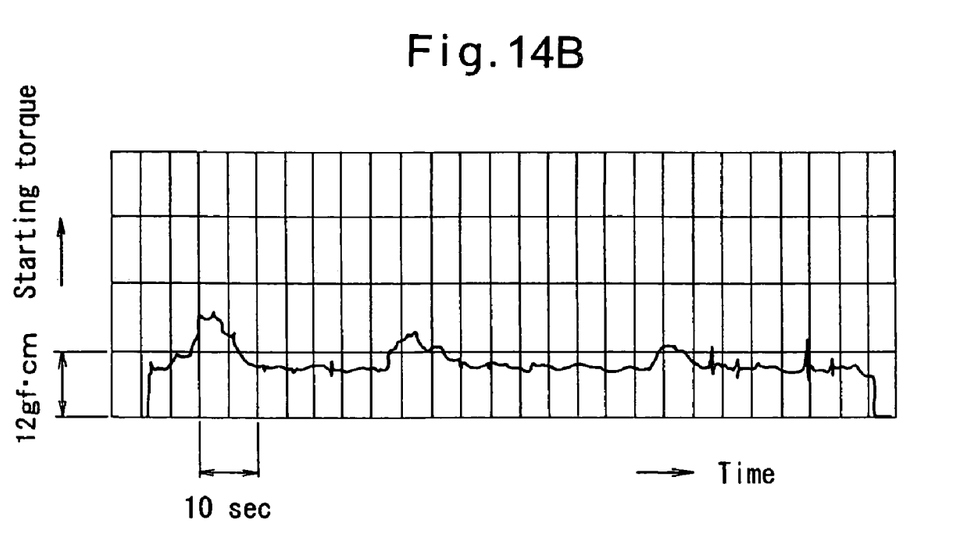
FIG. 14B is a graph showing measurement results of the starting torque of an angular ball bearing of a comparative article.

The starting torque of the angular ball bearing of the second embodiment, shown in FIGS. 9–13, was measured. FIG. 14A shows the measurement results. For comparison, FIG. 14B shows the measurement results for the starting torque of the angular ball bearing shown in FIGS. 15–17 (comparative article).

For measurement, as the article of the present invention, an angular ball bearing was used which has a bearing outer diameter of 26 mm, a bearing inner diameter of 10 mm, a bearing width of 8 mm, a retainer outer diameter of 19.3 mm, a retainer inner diameter of 15.7 mm, and a width of 7.2 mm. Also, as the angular ball bearing as the comparative article, an angular ball bearing of substantially the same sizes as above was employed.

As for test conditions, the central axis of the angular ball bearing was vertical, the axial load was 2 kgf, and the number of revolutions was 4 rpm.

As will be apparent from the test results, in the angular ball bearing of the second embodiment, there is no peak in the starting torque value. This means that it is turning smoothly.

This invention achieves the following effects.

According to a first aspect of the invention, since the radius of curvature of the conical guide surfaces formed on the retainer at their large-diameter ends is greater than the radius of curvature of the cylindrical inner surfaces of the cylindrical pockets, while the bearing is rotating at high speed, even if the retainer moves axially and the contact points between the balls and the conical guide surfaces move due to contact with the balls, which are rotating about their axes, diametric thrust force of the retainer is reduced, so that it is possible to suppress runout of the retainer. Further, the shearing force when shearing the lubricant due to the rotation of the balls about their axes is small, so that it is possible to reduce the bearing torque.

According to a second aspect of the invention, it is possible to obtain the same effects as in first aspect of the invention discussed above, and further, it is possible to increase fluidity of the lubricant by providing the four diametric grooves in the cylindrical inner surface of each pocket, so that it is possible to suppress heat buildup due to stirring of the lubricant and suppress temperature rise of the angular ball bearing.

According to a third aspect of the invention, the conical surfaces are formed at the inner-diameter side ends at positions opposing each other forwardly and rearwardly relative to the circumferential direction of the retainer on the cylindrical inner surfaces of the pockets, the lubricant supporting surfaces are formed at the inner-diameter ends of the conical surfaces so as to face inwardly of the pockets, and the linear ball guide edges parallel to the axis of the retainer are formed inside the lubricant supporting surfaces so that while the bearing is rotating at high speed, the linear ball guide edges contact the balls. Thus, it is possible to prevent diametric thrust force from being produced in the retainer, which prevents runout of the retainer.

Further, since lubricant is retained on the lubricant supporting surfaces, stable lubricating performance is obtainable.

According to a fourth aspect of the invention, it is possible to obtain the same effects as in the third aspect of the invention. Further, since the four diametric grooves are formed in the cylindrical inner surface of each pocket, it is possible to increase fluidity of the lubricant, so that it is possible to suppress temperature rise of the angular ball bearing.

What is claimed is:

1. A synthetic resin retainer comprising an annular member made of a synthetic resin and formed with a plurality of pockets to receive balls, said pockets having cylindrical inner surfaces, wherein a pair of conical guide surfaces to be guided by said balls are formed on the cylindrical inner surface of each said pocket at an inner-diameter end thereof so as to oppose each other in the circumferential direction of the retainer, and wherein the radius of curvature of each said conical guide surface at a large-diameter end thereof is larger than the radius of curvature of the cylindrical inner surface of each said pocket.

2. A synthetic resin retainer as claimed in claim 1 wherein in the cylindrical inner surface of each said pocket, diametric grooves are formed so as to divide said cylindrical inner surface into four parts comprising a pair of arcuate inner surfaces opposing each other in the circumferential direction of the retainer, and a pair of arcuate inner surfaces opposing each other in the axial direction of the retainer.

3. A synthetic resin retainer comprising an annular member made of a synthetic resin and formed with a plurality of pockets to receive balls, said pockets having cylindrical inner surfaces, wherein a pair of conical surfaces are formed on the cylindrical inner surface of each said pocket at an inner-diameter end thereof so as to oppose each other in the circumferential direction of the retainer, wherein a lubricant retaining surface is integrally formed from the inner-diameter end of each said conical surface inwardly of the pocket, and wherein a linear ball guide edge to be guided by a ball is formed inside each said lubricant retaining surface so as to be parallel to the axis of the retainer.

4. A synthetic resin retainer as claimed in claim 3 wherein in the cylindrical inner surface of each said pocket, diametric grooves are formed so as to divide said cylindrical inner surface into four parts comprising a pair of arcuate inner surfaces opposing each other in the circumferential direction of the retainer, and a pair of arcuate inner surfaces opposing each other in the axial direction of the retainer.

5. An angular ball bearing comprising a synthetic resin retainer mounted between an outer ring and an inner ring, and balls mounted in a plurality of pockets formed spaced circumferentially from each other in said retainer to support said outer ring and said inner ring so as to be rotatable relative to each other, wherein said pockets have cylindrical inner surfaces, wherein in the cylindrical inner surface of said each pocket, diametric grooves are formed so as to divide said cylindrical inner surface into four parts comprising a pair of arcuate inner surfaces opposing each other in the circumferential direction of the retainer, and a pair of arcuate inner surfaces opposing each other in the axial direction of the retainer, wherein a pair of conical guide surfaces to be guided by said balls are formed on the cylindrical inner surface of each said pocket at an inner-diameter end thereof so as to oppose each other in the circumferential direction of the retainer, and wherein the radius of curvature of said each conical guide surface at a large-diameter end thereof is larger than the radius of curvature of the cylindrical inner surface of each said pocket.

6. An angular ball bearing comprising a synthetic resin retainer mounted between an outer ring and an inner ring, and balls mounted in a plurality of pockets formed spaced circumferentially from each other in said retainer for supporting said outer ring and said inner ring so as to be rotatable relative to each other, wherein said pockets have cylindrical inner surfaces, wherein in the cylindrical inner surface of each said pocket, diametric grooves are formed so as to divide said cylindrical inner surface into four parts comprising a pair of arcuate inner surfaces opposing each other in the circumferential direction of the retainer, and a pair of arcuate inner surfaces opposing each other in the axial direction of the retainer, wherein a pair of conical surfaces are formed on the cylindrical inner surface of said each pocket at an inner-diameter end thereof so as to oppose each other in the circumferential direction of the retainer, wherein a lubricant retaining surface is integrally formed from the inner-diameter end of each said conical surface inwardly of the pocket, and wherein a linear ball guide edge to be guided by a ball is formed inside each said lubricant retaining surface so as to be parallel to the axis of the retainer.

\* \* \* \* \*